United States Patent [19]
Mecca

[11] Patent Number: 4,791,011
[45] Date of Patent: Dec. 13, 1988

[54] VARIABLE BLIND

[76] Inventor: John Mecca, 110 Whittier Dr., San Remo, N.Y. 11754

[21] Appl. No.: 927,376

[22] Filed: Nov. 6, 1986

[51] Int. Cl.$^4$ .............................................. E06B 3/24
[52] U.S. Cl. ....................................... 428/34; 52/788; 156/109
[58] Field of Search ........................... 428/34; 52/788; 156/109

[56] References Cited

U.S. PATENT DOCUMENTS

| | | | |
|---|---|---|---|
| 3,741,652 | 6/1973 | Brock et al. | 428/34 X |
| 3,837,129 | 9/1974 | Lossell | 428/34 X |
| 4,067,161 | 1/1978 | Rensch | 52/282 X |
| 4,097,320 | 6/1978 | Brauer et al. | 156/109 |
| 4,125,640 | 11/1978 | Conant et al. | 428/35 X |
| 4,431,691 | 2/1984 | Greenlee | 428/34 |
| 4,432,174 | 2/1984 | Grether et al. | 428/34 X |
| 4,448,847 | 5/1984 | Bell et al. | 428/418 X |
| 4,622,249 | 11/1986 | Bowser | 428/34 |
| 4,680,206 | 7/1987 | Yoxon et al. | 156/109 X |

OTHER PUBLICATIONS

The Title Page, the Verso of the Title Page and Page 608 of Webster's Seventh New Collegiate Dictionary, G&C Merriam Company, Publishers, Springfield, Mass.

Primary Examiner—Henry F. Epstein
Attorney, Agent, or Firm—Leonard Belkin

[57] ABSTRACT

A set of two panes of transparent material brought within proximity to being plane parallel of each others surfaces facing each other; an equidistant space between them is maintained by a perimeter moulding of elastic material enclosing within the two panes a space that is filled with a colloidal liquid of composition, that by compressing the panes together permits light and other electromagnetic wavelengths to pass due to its varying thickness; the compressible elastic perimeter connecting the panes edge together as along its internal edge a trough depression acting as a reservoir for the colloidal liquid to go to when the panes are compressed together by C clamps compressing the panes when their cams are actuated. The panes are held apart by the elastic perimeter moulding.

8 Claims, 2 Drawing Sheets

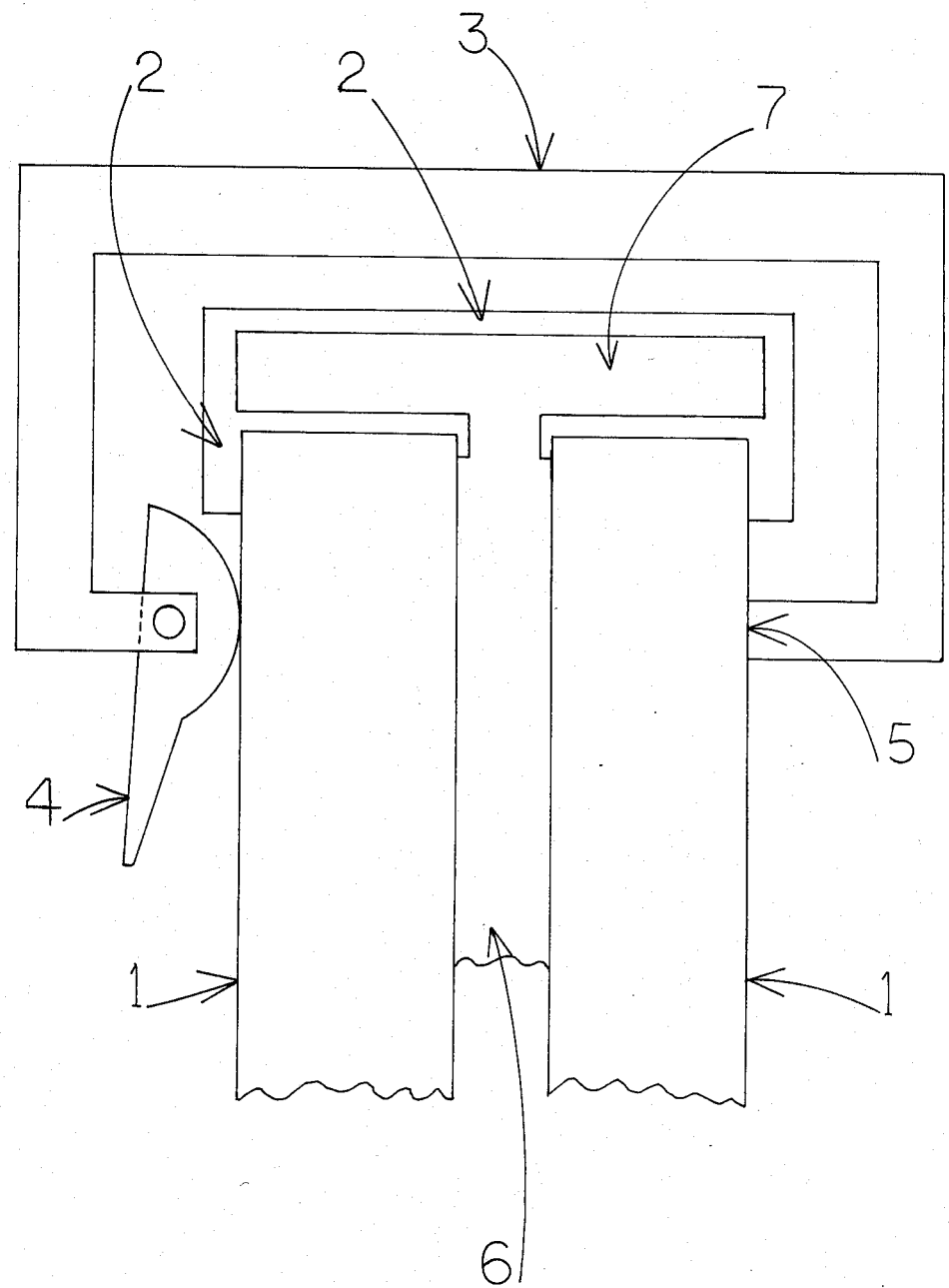

VARIABLE BLIND

TECHNICAL FIELD

Relates to the imposition of opaque substances within a window frame to block solar rays and allow their passage.

BACKGROUND OF INVENTION

Numerous proposals to block the suns rays have been developed using opaque materials such as sheets of plastic and metal; where they are placed in front of the window aperture and drawn away from the line of sight, to fold or roll up.

A need to alternately have a window opaque, and then transparent has been considered imperative where shielding from all electromagnetic spectrum components when it has been inconvenient or infeasible due to constraints of use of space, or placement overhead, or under weightless conditions.

Accordingly there exists a need to combine space saving techniques, and ease of operation with variability of visual quality associated with its ability to go from opaque to translucent to transparent. The device of the present invention fulfills these several foregoing objectives.

SUMMARY OF INVENTION

The present invention takes advantage of colloidal liquids that contain sufficient particulate to appear transparent at thicknesses of one thousandths of an inch, and completely opaque at thicknesses of twenty thousandths of an inch. This liquid being entrained between two transparent sheets of glass, or plastic that have a space between them of twenty thousandths of an inch; being maintained at that maximum distance from each other equally by an elastic frame of silicone. This colloidal liquid entrained between the transparent sheets has a set of compression clamps at strategic points around the sheets perimeter to compress the transparent sheets together, thereby reducing the space between them from twenty thousandths down to five thousandths of an inch and allowing light to transverse the diminished thickness of liquid; using lead or carbon colloidals etc. .

It is therefore an object of the present invention to utilize a colloidal liquids relative thickness to act in place of a mechanical blind obstructor sheet.

It is another object to allow partial blockage of solar spectrum transmission, and as a neutron moderator.

It is another object to eliminate the bulk of activating mechanisms.

It is an object to protect satellite apertures from being blinded by laser radiation.

It is another object to selectively stop various wavelengths of the electromagnetic spectrum, by selecting the proper cooloidal particulate elements.

It is another object to provide insulation from heat, light, x-rays, electrical interference, infared, ultraviolet rays from penetration wholly or in part.

The novel features which are believed to be characteristic of the invention, both to its organization and method of facilitating screening together with further objectives and advantages thereof will be better understood from the following description considered in connection with the accompanying drawings in which a presently preferred embodiment of the invention is illustrated by way of example. It is to be expressly understood that the drawings are for the purpose of illustration and description only, and are not intended as a definition of the limits of the invention.

BRIEF DESCRIPTION OF THE DRAWINGS

FIG. 2 is an edge wise view sectional cutaway where the two panes in relation to each other create between them a space for entrainment of the colloidal liquid of appropriate makeup to block radiation, an elastic moulding edge holding the panes together at their perimeter has moulded within it a space used as a reservoir for colloidal liquid to escape into during compression by the cam clamps actuation.

DETAILED DESCRIPTION OF THE PRESENTLY PREFERRED EMBODIMENT

Figure 1:
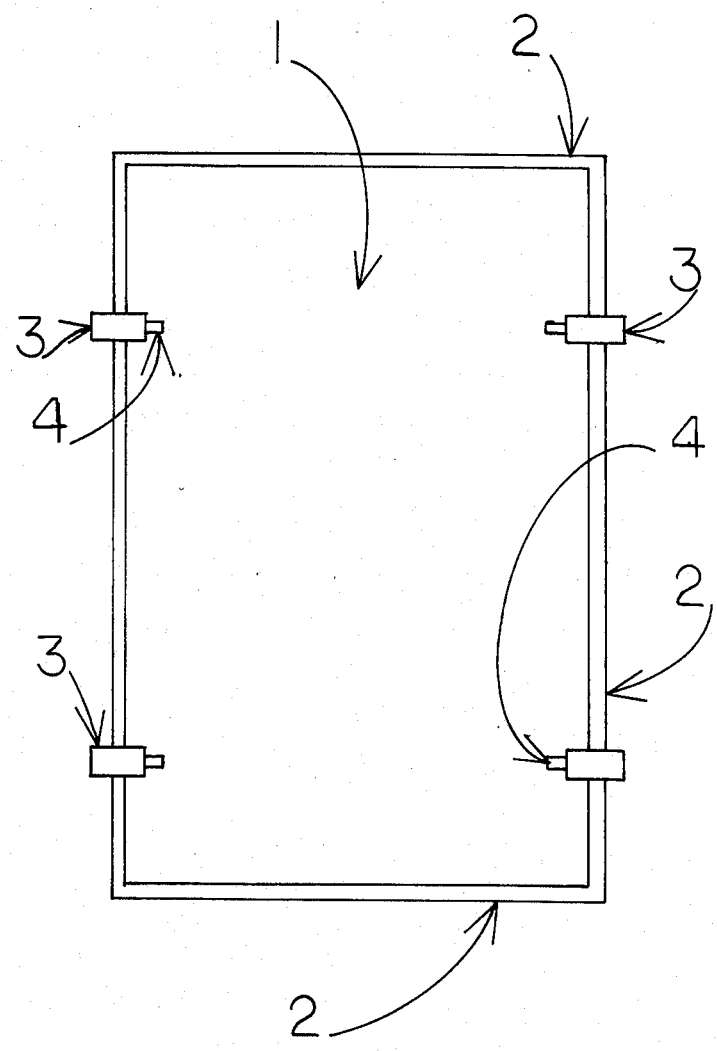
FIG. 1 is a front view as one would look through a window, around the rectangular sheet is an elastic moulding, at intervals there are cam clamps to compress the colloidal liquid from between the sheet panes.

The precise shape and sizes of the components described are not essential to the invention unless otherwise indicated.

FIG. 1 shows rectangular transparent sheet 1 surrounded at its perimeter by elastic moulding of silicone 2, at intervals around the perimeter there are cam actuated clamps 3 with their cam handles 4.

FIG. 2 shows transparent panes 1 held apart by elastic silicone moulding edge 2. within the elastic moulding is moulded a reservoir channel 7 extending its entire circumference; wrapped around the edge of panes 1's is clamp 3 which rests stationarily upon the pane 1 at glued point 5, its other end terminates on the opposing pane at lever cam actuated compressor 4. Between the panes 1's is the colloidal liquid 6 of appropriate composition.

I claim:

1. A variably transparent window consisting of a pair of spaced sheets of transparent material comprising:
   a. means mounted along the perimeter of said window sealing the space between said spaced sheets and forming a reservoir communicating with said space;
   b. a liquid filling the space between said spaced sheets and said reservoir, the transparency of said liquid being a function of and changing substanially with the thickness of the layer of said liquid between said sheets so that the transparency of said liquid sandwiched between said sheets increases as said thickness decreases; and
   c. means for reducing the spacing between said sheets thereby increasing the transparency of said window.

2. The window of claim 1 in which said mounted means is made of an elastic material whereby said reservoir is able to accomodate liquid displaced from the space between said sheets when the latter are brought closer together by said changing means.

3. The window of claim 1 in which said reducing means comprises a plurality of means spaced along the perimeter of said window for adjustably compressing said sheets against said liquid filling the space between said sheets to effect the spacing between said sheets.

4. The invention of claim 1 in which said liquid contains a particulate in colloidal suspension.

5. The method of changing the transparency of a window consisting of a pair of parallel, spaced sheets of transparent material, means mounted along the perimeter of said window sealing the space between said spaced sheets and forming a reservoir communicating with said space, and a liquid filling the space between said spaced sheets and said reservoir, the transparency of said liquid being a function of and changing substantially the thickness of the layer of said liquid between said sheets, said method comprising the steps of compressing said sheets toward each other to reduce the thickness of the layer of said liquid between said sheets in order to increase the transparency of said window.

6. The method of claim 5 wherein said liquid contains a particulate in colloidal suspension.

7. The method of claim 5 wherein said mounted means is made of an elastic material whereby said reservoir is able to accomodate liquid displaced from the space between said sheets when said sheets are compressed against each other.

8. The method of changing the transparency of a window comprising a pair of spaced sheets of transparent material filled with a liquid containing a particulate in colloidal solution, the method comprising the steps of reducing the spacing between said sheets in order to reduce the thickness of the layer of said liquid therebetween to increase the transparency of said layer of liquid, and absorbing liquid displaced from said spacing in a reservoir formed from a flexible materials.

* * * * *